(12) United States Patent
Jung et al.

(10) Patent No.: US 9,937,773 B2
(45) Date of Patent: Apr. 10, 2018

(54) APPARATUS AND METHOD FOR CONTROLLING COMPRESSOR

(71) Applicants: Hyundai Motor Company, Seoul (KR); Kia Motors Corporation, Seoul (KR)

(72) Inventors: Tae Hun Jung, Seoul (KR); Hyuck Yong Kwon, Suwon-si (KR); Jeong Sik Seo, Hwaseong-si (KR); Jaeyeon Moon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/360,067

(22) Filed: Nov. 23, 2016

(65) Prior Publication Data
US 2018/0043753 A1 Feb. 15, 2018

(30) Foreign Application Priority Data
Aug. 12, 2016 (KR) .......................... 10-2016-0102982

(51) Int. Cl.
*B60H 1/00* (2006.01)
*B60H 1/32* (2006.01)
*F04B 27/14* (2006.01)

(52) U.S. Cl.
CPC ... *B60H 1/3208* (2013.01); *B60H 2001/3255* (2013.01); *B60H 2001/3266* (2013.01); *B60H 2001/3272* (2013.01)

(58) Field of Classification Search
CPC ... B60H 1/32; B60H 1/00; F04B 27/14; F04B 49/06

USPC .......................................................... 701/36
See application file for complete search history.

(56) References Cited

U.S. PATENT DOCUMENTS

| | | | | |
|---|---|---|---|---|
| 2003/0216847 | A1* | 11/2003 | Bellinger | B60W 10/06 701/51 |
| 2012/0221223 | A1* | 8/2012 | Schaffeld | F02B 33/38 701/102 |
| 2012/0290187 | A1* | 11/2012 | Oesterreicher | B60W 50/0205 701/99 |

FOREIGN PATENT DOCUMENTS

| | | |
|---|---|---|
| KR | 1999-0064974 A | 8/1999 |
| KR | 10-0778595 B1 | 11/2007 |
| KR | 10-2009-0131928 A | 12/2009 |

(Continued)

*Primary Examiner* — Tan Q Nguyen
(74) *Attorney, Agent, or Firm* — Morgan, Lewis & Bockius LLP

(57) ABSTRACT

A compressor control apparatus may include a data detector detecting status data including at least one of vehicle speed, engine speed, accelerator pedal location value, and slope way measurement value; and controller that determines whether engine speed and accelerator pedal location value of the status data satisfy oscillation acceleration entering condition, if the vehicle speed exists in predetermined range and that sets basic operation rate of compressor according to the engine speed and the accelerator pedal location value, if engine speed and accelerator pedal location value of the status data satisfy oscillation acceleration entering condition and that generates final operation rate of the compressor using the basic operation rate, slope way constant according to the slope way measurement value, and air temperature compensation constant according to air temperature and that controls operation of the compressor based on the final operation rate.

19 Claims, 11 Drawing Sheets

(56) References Cited

FOREIGN PATENT DOCUMENTS

KR 10-2012-0002315 A 1/2012
KR 10-2013-0063786 A 6/2013

* cited by examiner

FIG. 4

| Division | 800rpm | 1000rpm | 1500rpm | 2000rpm | 3000rpm | 4000rpm | 5000rpm | 6000rpm |
|---|---|---|---|---|---|---|---|---|
| Entering (APS openness, % or more) | 70 ↑ | 70 ↑ | 70 ↑ | 70 ↑ | 70 ↑ | 70 ↑ | 70 ↑ | 70 ↑ |
| Release (APS openness, % or less) | 67 ↓ | 67 ↓ | 67 ↓ | 67 ↓ | 67 ↓ | 67 ↓ | 67 ↓ | 67 ↓ |

| Division | 800rpm | 1000rpm | 1500rpm | 2000rpm | 2500rpm | 3000rpm | 4000rpm | 5000rpm |
|---|---|---|---|---|---|---|---|---|
| APS = 0% | 100 | 100 | 100 | 100 | 100 | 100 | 100 | 100 |
| APS = 25% | 100 | 100 | 100 | 100 | 100 | 100 | 100 | 100 |
| APS = 40% | 100 | 100 | 100 | 100 | 100 | 100 | 100 | 100 |
| APS = 50% | 100 | 100 | 100 | 100 | 100 | 100 | 100 | 100 |
| APS = 70% | 100 | 100 | 100 | 100 | 100 | 100 | 100 | 100 |
| APS = 80% | 50 | 50 | 50 | 50 | 50 | 50 | 50 | 50 |
| APS ≥ 90% | 35 | 35 | 35 | 35 | 35 | 35 | 35 | 35 |

| Division | 800rpm | 1000rpm | 1500rpm | 2000rpm | 3000rpm | 4000rpm | 5000rpm | 6000rpm |
|---|---|---|---|---|---|---|---|---|
| Entering (APS openness, % or more) | 35 ↑ | 35 ↑ | 45 ↑ | 55 ↑ | 65 ↑ | 75 ↑ | 85 ↑ | 85 ↑ |
| Release (APS openness, % or less) | 32 ↓ | 32 ↓ | 42 ↓ | 52 ↓ | 63 ↓ | 72 ↓ | 82 ↓ | 82 ↓ |

FIG. 9

| Division | 800rpm | 1000rpm | 1500rpm | 2000rpm | 3000rpm | 4000rpm | 5000rpm | 6000rpm |
|---|---|---|---|---|---|---|---|---|
| APS = 0% | 100 | 100 | 100 | 100 | 100 | 100 | 100 | 100 |
| APS = 34% | 100 | 100 | 100 | 100 | 100 | 100 | 100 | 100 |
| APS = 35% | 100 * A | 100 * A | 100 * A | 100 * A | 100 * A | 100 * A | 100 * A | 100 * A |
| APS = 45% | 50 * B | 50 * B | 50 * B | 100 * B | 100 * B | 100 * B | 100 * B | 100 * B |
| APS = 55% | 50 * B | 50 * B | 50 * B | 100 * B | 100 * B | 100 * B | 100 * B | 100 * B |
| APS = 65% | 45 * B | 45 * B | 45 * B | 50 * B | 100 * B | 100 * B | 100 * B | 100 * B |
| APS = 75% | 35 * C | 35 * C | 35 * C | 50 * C | 50 * C | 100 * C | 100 * C | 100 * C |
| APS = 85% | 35 * C | 35 * C | 35 * C | 50 * C | 35 * C | 35 * C | 100 * C | 100 * C |
| APS ≥ 86% | 0 | 0 | 0 | 0 | 35 * C | 35 * C | 35 * C | 35 * C |

|  | A | B | C |
|---|---|---|---|
| Slope way measurement value ≥ 1.8 | 0.35 | 0.5 | 0 |
| Others | 1 | 1 | 1 |

|  | A | B | C |
|---|---|---|---|
| Air temperature ≥ 37.5 | 1 | 1 | 1 |
| Air temperature < 37.5 | 1 | 1 | 0 |

APPARATUS AND METHOD FOR CONTROLLING COMPRESSOR

CROSS-REFERENCE TO RELATED APPLICATION

The present application claims priority to and the benefit of Korean Patent Application No. 10-2016-0102982 filed on Aug. 12, 2016, the entire contents of which are incorporated herein by reference.

BACKGROUND OF THE INVENTION

Field of the Invention

The present invention relates to a compressor control apparatus. More particularly, the present invention relates to an apparatus and method for controlling a compressor that can control the compressor according to a running state of a vehicle.

Description of Related Art

Nowadays, to overcome global warming and oil resource depletion, each country reinforces an exhaust regulation and a fuel consumption regulation. For fuel consumption enhancement, enhancement of auxiliary machinery is requested, and one of such auxiliary machinery is an air conditioner.

Such an air conditioner uses a latent heat of a refrigerant that is compressed and circulates with a torque of an engine and includes an evaporator, a compressor, and a condenser.

The compressor absorbs and compresses a refrigerant of a gas state that is evaporated in the evaporator and delivers a refrigerant of a high temperature and high pressure to the condenser. The condenser forcibly cools a refrigerant that is provided from the compressor and provides a refrigerant that is expanded into a vapor state of a low temperature and low pressure through an expansion valve to the evaporator. The evaporator vaporizes a refrigerant with a gas state of a low temperature and low pressure.

Conventionally, when controlling a compressor, the compressor is controlled regardless of flatland running and hill climbing. Accordingly, in a conventional case, a case frequently has occurred in which operation of the compressor stops and thus a problem has occurred that an air conditioning performance is worsened.

Further, in order to improve an air conditioning performance, when changing a stop condition of the compressor, upon hill climbing, a problem occurs that a power performance deteriorates.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and method for controlling a compressor having advantages of being configured for controlling the compressor according to a running state of a vehicle.

The present invention has been made in an effort to further provide an apparatus and method for controlling a compressor having advantages of being capable of securing a power performance by controlling an operation rate of the compressor when a vehicle climbs a hill.

Various aspects of the present invention are directed to providing a compressor control apparatus including: a data detector that detects status data including at least one of a vehicle speed, an engine speed, an accelerator pedal location value, and a slope way measurement value; and a controller that determines whether an engine speed and an accelerator pedal location value of the status data satisfy an oscillation acceleration entering condition, when the vehicle speed exists in a predetermined range and that sets a basic operation rate of a compressor according to the engine speed and the accelerator pedal location value, when an engine speed and an accelerator pedal location value of the status data satisfy an oscillation acceleration entering condition and that generates a final operation rate of the compressor using the basic operation rate, a slope way constant according to the slope way measurement value, and an air temperature compensation constant according to an air temperature and that controls operation of the compressor based on the final operation rate. The controller may determine first to third slope way constants through a predetermined correction table, when the slope way measurement value is equal to or larger than a reference value, select a slope way constant according to at least one of the engine speed and the accelerator pedal location value among the first to third slope way constants, and generate a final operation rate of the compressor using a basic operation rate of the compressor, a selected slope way constant, and an air temperature compensation constant.

The controller may select a first slope way constant, when an accelerator pedal location value corresponds to a first range among the first to third slope way constants, select a second slope way constant, when an accelerator pedal location value corresponds to a second range, and selects a third slope way constant, when an accelerator pedal location value corresponds to a third range or when an accelerator pedal location value corresponds to a fourth range and when an engine speed corresponds to a fifth range.

The controller may set a basic operation rate of an engine speed and an accelerator pedal location value through a predetermined oscillation operation table.

The controller may filter a slope way measurement value based on the slope way measurement value and a predetermined filter constant and determine a slope way constant using the filtered slope way measurement value.

The controller may determine first to third slope way constants using an air temperature, when a slope way measurement value is not input from the data detector.

The controller may determine whether a passing acceleration entering condition is satisfied based on the engine speed and the accelerator pedal location value, when the vehicle speed does not exist within a predetermined range and set a final operation rate using the basic operation rate of the compressor according to the accelerator pedal location value, when a passing acceleration entering condition is satisfied.

The controller may set a basic operation rate of the compressor according to an accelerator pedal location value through a predetermined passing operation table, when the passing acceleration entering condition is satisfied and set a final operation rate of the compressor using the basic operation rate of the compressor and a compensation constant according to an air temperature.

Another exemplary embodiment of Various aspects of the present invention are directed to providing a method of controlling a compressor including: determining whether a vehicle speed exists in a predetermined range; determining, when a vehicle speed exists in a predetermined range, whether an oscillation acceleration entering condition is satisfied based on a measured engine speed and accelerator pedal location value; setting, when the engine speed and the accelerator pedal location value satisfy an oscillation acceleration entering condition, a basic operation rate of a compressor according to the engine speed and the accelerator pedal location value; generating a plurality of slope way constants using a slope way measurement value; selecting a slope way constant according to an engine speed and an accelerator pedal location value among the plurality of slope way constants; generating a final operation rate of the compressor using at least one of a basic operation rate of the compressor, a selected slope way constant, and an air temperature compensation constant according to an air temperature; and controlling operation of the compressor based on the final operation rate.

According to an exemplary embodiment of the present invention, because a compressor can be controlled according to a running state of a vehicle, an air conditioning performance can be prevented from being deteriorated.

Further, when a vehicle climbs a hill, an operation rate of a compressor can be controlled and thus a power performance can be secured and fuel consumption of the vehicle can be enhanced.

In addition, an effect that may be obtained or estimated by an exemplary embodiment of the present invention is directly or implicitly described in a detailed description of an exemplary embodiment of the present invention. That is, various effects that are estimated according to an exemplary embodiment of the present invention will be described in a detailed description to be described later.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 illustrates a passing condition table according to an exemplary embodiment of the present invention.

FIG. 5 illustrates a passing operation table according to an exemplary embodiment of the present invention.

FIG. 8 illustrates an oscillation condition table according to an exemplary embodiment of the present invention.

FIG. 9 illustrates an oscillation operation table according to an exemplary embodiment of the present invention.

FIG. 10 illustrates a first correction table according to an exemplary embodiment of the present invention.

FIG. 11 illustrates a second correction table according to an exemplary embodiment of the present invention.

Figure 1:
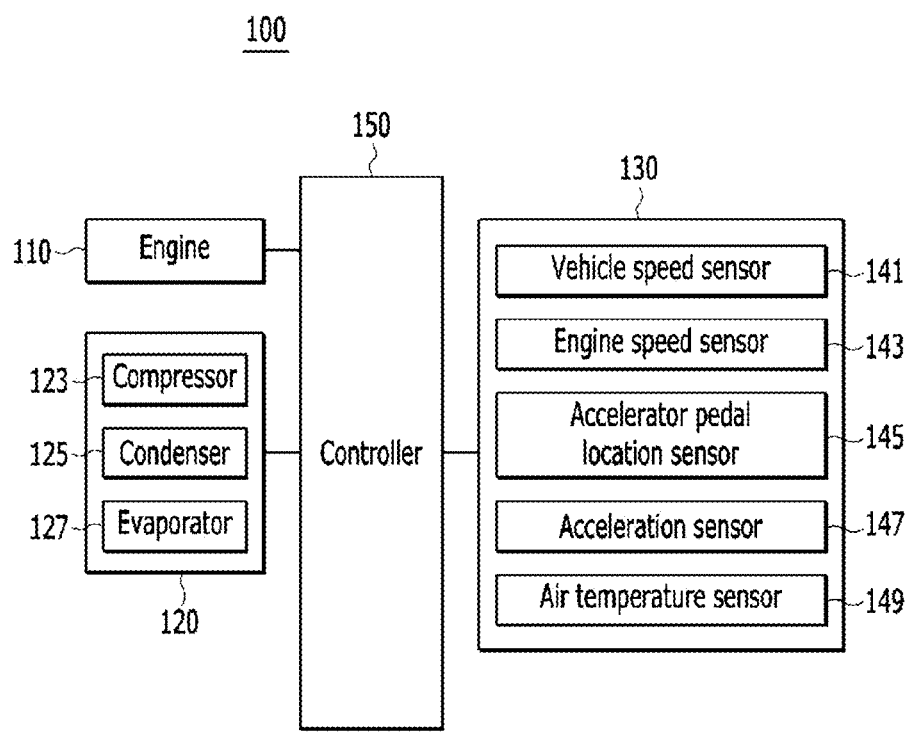
FIG. 1 is a block diagram illustrating a configuration of a compressor control apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Detailed descriptions of well-known functions and structures incorporated herein may be omitted to avoid obscuring the subject matter of the present invention. Terms used herein are defined in consideration of functions of the present invention and may vary depending on a user's or an operator's intension and usage. Therefore, the terms used herein should be understood based on the descriptions made herein.

Further, the following exemplary embodiment may use terms by appropriately changing, integrating, or separating to be clearly understood by a person of ordinary skill in the art in order to efficiently describe a core technical characteristic of the present invention, but the present invention is not limited thereto.

Hereinafter, an exemplary embodiment of the present invention will be described in detail with reference to the accompanying drawings.

FIG. 1 is a block diagram illustrating a configuration of a compressor control apparatus according to an exemplary embodiment of the present invention.

Referring to FIG. 1, a compressor control apparatus 100 includes an engine 110, an air conditioner 120, a data detector 130, and a controller 150.

The engine 110 burns fuel to generate power. That is, as the engine 110, various engines 110 including a gasoline engine or a diesel engine using existing fossil fuel may be used.

The engine 110 may provide power for operation of a compressor 123 of the air conditioner 120.

The air conditioner 120 may be used for heating, ventilation, and air conditioning within a vehicle. For this reason, the air conditioner 120 includes a compressor 123, a condenser 125, and an evaporator 127. In the air conditioner 120, as an operation rate of the compressor 123 increases, an air conditioning performance can be improved.

The compressor 123 absorbs and compresses a refrigerant from the evaporator 127. In a vehicle, as the compressor 123, a variable capacity compressor 123 is widely used.

The compressor 123 may include a pressure adjustment valve, and a pressure of a refrigerant may be adjusted by the pressure adjustment valve.

The condenser 125 condenses and liquefies a refrigerant that is compressed by the compressor 123.

The evaporator 127 vaporizes a refrigerant that is liquefied by the condenser 125.

Such an air conditioner 120 is well known to a person of an ordinary skill in the art and therefore a detailed description thereof will be omitted.

The data detector 130 detects status data for controlling the compressor 123 and provides the detected status data to the controller 150.

The data detector 130 includes a vehicle speed sensor 141, an engine speed sensor 143, an accelerator pedal location sensor 145, an acceleration sensor 147, and an air temperature sensor 149.

The vehicle speed sensor 141 measures a vehicle speed and provides the vehicle speed to the controller 150.

The engine speed sensor 143 measures a rotation speed (RPM) of the engine 110 and provides the measured engine speed to the controller 150.

The accelerator pedal location sensor 145 measures a level in which a driver steps an accelerator pedal. That is, the accelerator pedal location sensor 145 measures a location value (a level in which a driver steps an accelerator pedal) of the accelerator pedal and provides the measured location value of the accelerator pedal to the controller 150. When the accelerator pedal is completely stepped, a location value of the accelerator pedal may be 100%, and when the accelerator pedal is not stepped, a location value of the accelerator pedal may be 0%.

The acceleration sensor 147 measures a slope way measurement value according to longitudinal acceleration of the vehicle and provides the measured slope way measurement value to the controller 150. In the instant case, the acceleration sensor 147 may be a longitudinal acceleration sensor 147. The controller 150 may determine a slope through a slope way measurement value that is measured by the acceleration sensor 147. For example, when a slope way measurement value is 1.8, the controller 150 may determine that a slope is 18%.

Here, to determine a slope, the acceleration sensor 147 was used, but the present invention is not limited thereto and any sensor that may determine a slope may be used.

The air temperature sensor 149 measures an air temperature, which is an outside temperature of the vehicle. The air temperature sensor 149 provides the measured air temperature to the controller 150.

The controller 150 controls the engine 110, the air conditioner 120, and the data detector 130, which are constituent elements of the compressor control apparatus 100.

Specifically, the controller 150 receives an input of status data from the data detector 130. In the instant case, the controller 150 is connected with the data detector 130 through communication within the vehicle. For example, communication within the vehicle may be Controller Area Network (CAN) communication.

The controller 150 determines a vehicle speed, an engine speed, an accelerator pedal location value, a slope way measurement value, and an air temperature that are included in status data and determines whether a vehicle status corresponds to oscillation acceleration or passing acceleration based on status data. When a vehicle status corresponds to oscillation acceleration, the controller 150 sets a basic operation rate according to the engine speed and the accelerator pedal location value and generates a final operation rate based on a basic operation rate, a slope way constant according to a slope way measurement value, and an air temperature compensation constant according to an air temperature.

When a vehicle status corresponds to passing acceleration, the controller 150 generates a basic operation rate according to an accelerator pedal location value and generates a final operation rate using a basic operation rate and an air temperature compensation constant according to an air temperature.

The controller 150 controls operation of the compressor 123 based on the generated final operation rate.

For such an object, the controller 150 may be implemented into at least one processor operating by a predetermined program, and the predetermined program may include a series of instructions for performing each step of a method of controlling a compressor according to an exemplary embodiment of the present invention. Such a method of controlling the compressor will be described in detail with reference to FIGS. 2 and 11.

Hereinafter, a method of controlling the compressor 123 will be described with reference to FIGS. 2 to 11.

Figure 2:
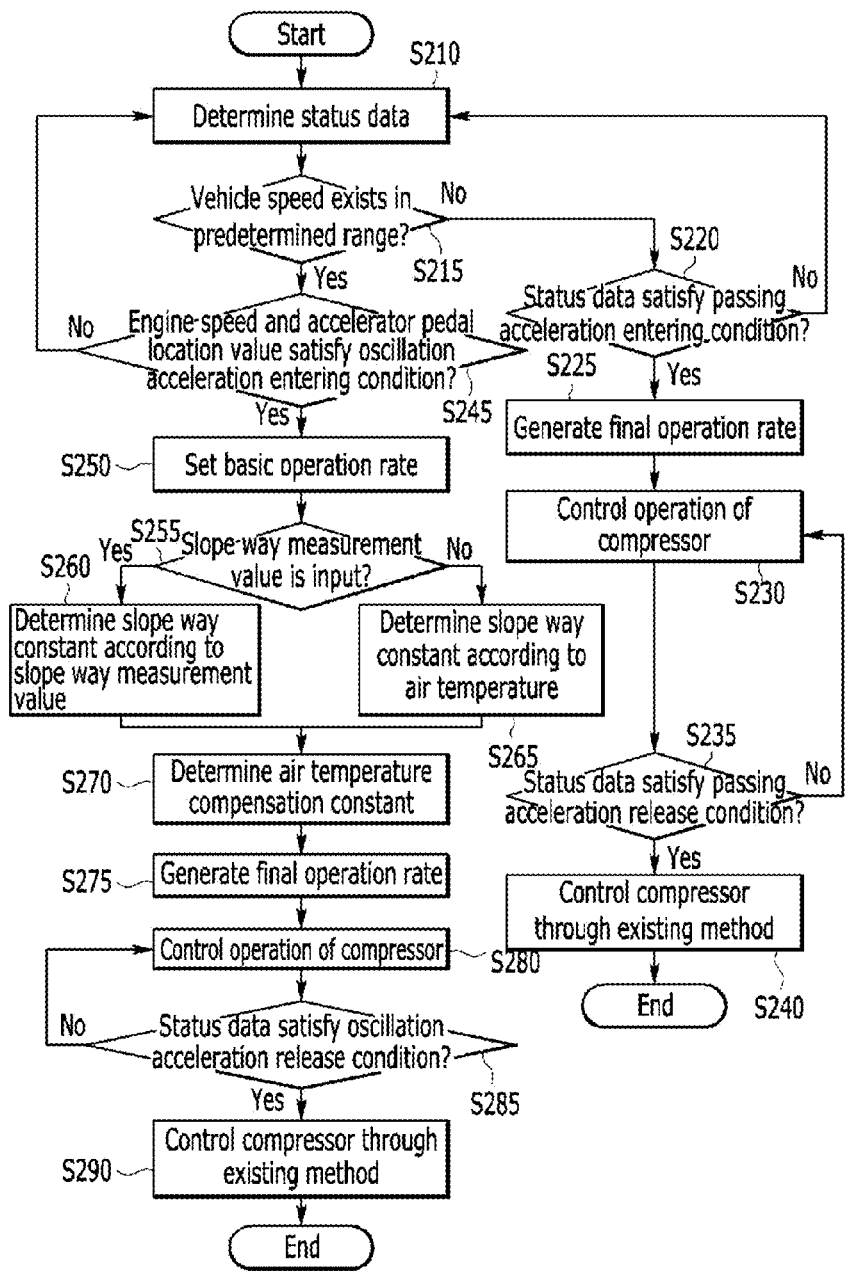
FIG. 2 is a flowchart illustrating a method of controlling a compressor according to an exemplary embodiment of the present invention.

FIG. 2 is a flowchart illustrating a method of controlling a compressor according to an exemplary embodiment of the present invention.

Referring to FIG. 2, to control the compressor 123, the controller 150 determines status data (S210). In other words, the data detector 130 detects status data including a vehicle speed, an engine speed, an accelerator pedal location value, a slope way measurement value, and an air temperature. The data detector 130 provides the detected status data to the controller 150. The controller 150 determines status data that are received from the data detector 130.

The controller 150 determines whether a vehicle speed exists in a predetermined range (S215). In other words, the controller 150 determines whether a power switch of the air conditioner 120 is turned on by a driver, and if a power switch of the air conditioner 120 is turned on by a driver, the controller 150 determines whether a vehicle speed exists in a predetermined range. In this case, a predetermined range becomes a reference to determine whether the vehicle corresponds to oscillation acceleration and may be previously set. For example, a predetermined range may be from 0 kph to less than 20 kph.

When a vehicle speed does not exist within a predetermined range, the controller 150 determines whether a passing acceleration entering condition is satisfied based on an engine speed and an accelerator pedal location value (S220).

Figure 3:
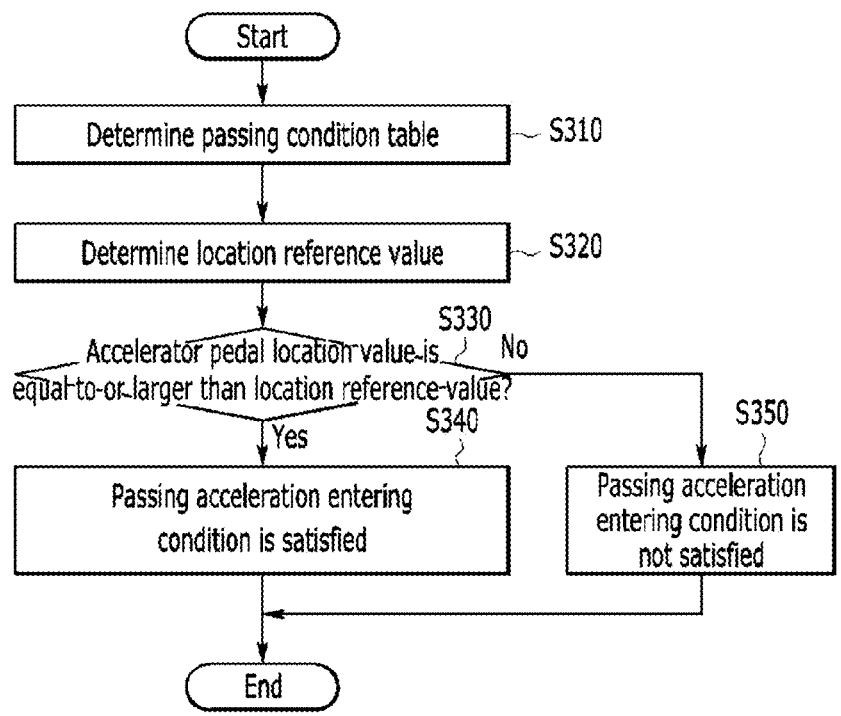
FIG. 3 is a flowchart illustrating a method of determining whether a passing acceleration entering condition is satisfied in a method of controlling a compressor according to an exemplary embodiment of the present invention.

Specifically, as shown in FIG. 3, when a vehicle speed does not exist within a predetermined range, the controller 150 determines a passing condition table (S310). For example, when a vehicle speed is 20 kph or more, the controller 150 may determine a passing condition table.

In the instant case, the passing condition table includes a location reference value for performing a passing acceleration control according to each of a plurality of engine speeds and is previously set. Further, the passing condition table may include a location reference value for releasing a passing acceleration control according to each of a plurality of engine speeds.

For example, the passing condition table may be represented with a reference numeral 400 of FIG. 4. The passing condition table 400 of FIG. 4 is an illustration for describing an exemplary embodiment of the present invention, but is not limited thereto.

The controller 150 determines a location reference value according to an engine speed that is determined at step S210 through the passing condition table (S320). For example, as shown in FIG. 4, when an engine speed is 1500 rpm, the controller 150 may extract and determine 70%, which is a location reference value in which the engine speed is matched to 1500 rpm through the passing condition table 400.

The controller 150 determines whether an accelerator pedal location value is equal to or larger than a location reference value (S330).

When an accelerator pedal location value is equal to or larger than a location reference value, the controller 150 determines that a passing acceleration entering condition is satisfied (S340). For example, as shown in FIG. 4, when an accelerator pedal location value is 80%, the accelerator pedal location value is equal to or larger than a location reference value and thus the controller 150 may determine that a passing acceleration entering condition is satisfied. Thereafter, the process continues at step S225 and the controller 150 may generate a final operation rate.

When an accelerator pedal location value is less than a location reference value, the controller 150 determines that a passing acceleration entering condition is not satisfied (S350). For example, as shown in FIG. 4, when the accelerator pedal location value is 68%, the accelerator pedal location value is less than a location reference value and thus the controller 150 may determine that a passing acceleration entering condition is not satisfied. Thereafter, the process returns to step S210 and the controller 150 may monitor status data.

When an engine speed and an accelerator pedal location value satisfy a passing acceleration entering condition, the controller 150 sets a basic operation rate of the compressor 123 according to the accelerator pedal location value and generates a final operation rate using the basic operation rate (S225).

In other words, the controller 150 extracts an operation rate that is matched to the accelerator pedal location value through the passing operation table and sets the operation rate to a basic operation rate.

In the instant case, the passing operation table includes an operation rate that is matched to the engine speed and the accelerator pedal location value and is previously set. For example, the passing operation table may be represented with a reference numeral 500 of FIG. 5. As shown in FIG. 5, the passing operation table 500 may determine that an operation rate does not change according to increase of an engine speed and that an operation rate changes according to an accelerator pedal location value.

For example, as shown in FIG. 5, when an accelerator pedal location value is 80%, the controller 150 may extract an operation rate of 50 through the passing operation table 500 and set the operation rate to a basic operation rate.

The passing operation table 500 of FIG. 5 is an illustration for describing an exemplary embodiment of the present invention, but is not limited thereto.

The controller 150 determines an air temperature compensation constant according to an air temperature of status data. That is, the controller 150 determines an air temperature compensation constant according to an air temperature through a compensation table. In the instant case, the compensation table includes a compensation constant that is matched to each of a plurality of air temperatures and may be previously set. For example, the compensation table may be represented with a reference numeral 600 of FIG. 6.

Figure 6:
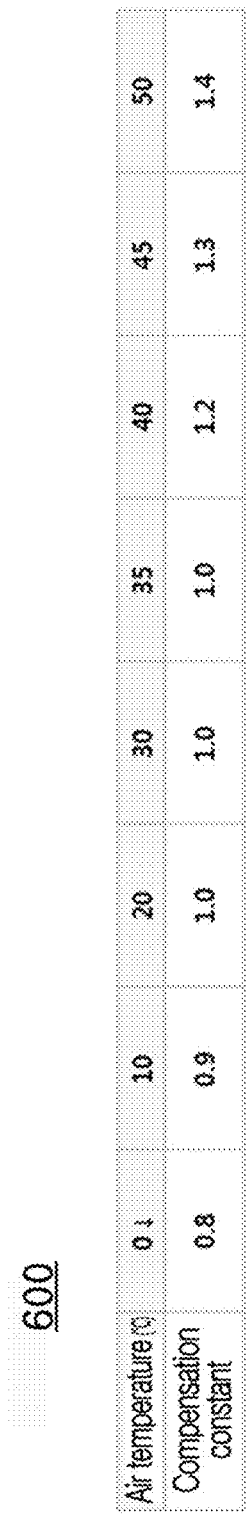
FIG. 6 illustrates a compensation table according to an exemplary embodiment of the present invention.

For example, as shown in FIG. 6, when an air temperature is 30°, the controller 150 may extract a compensation constant 1.0 in which an air temperature is matched to 30 through a compensation table 600 and determine an air temperature compensation constant.

The compensation table 600 of FIG. 6 is an illustration for describing an exemplary embodiment of the present invention, but is not limited thereto.

The controller 150 generates a final operation rate using a basic operation rate and an air temperature compensation constant according to an air temperature. That is, the controller 150 may generate a final operation rate by performing multiplication determination of a basic operation rate and an air temperature compensation constant. For example, when a basic operation rate is 50% and when an air temperature compensation constant is 1.0, the controller 150 may generate a final operation rate of 50% by performing multiplication determination of a basic operation rate of 50% and an air temperature compensation constant of 1.0.

The controller 150 controls operation of the compressor 123 using a final operation rate (S230). For example, because a final operation rate is 50%, the controller 150 may control the compressor 123 such that an operation rate of the compressor 123 becomes 50%. The compressor 123 may be duty controlled, and the compressor operation rate may mean the duty of a control signal. Here, the duty means a rate of an ON signal period to a predetermined cycle of the control signal. For example, when the duty is 50%, an On signal occurs for 50% of a predetermined cycle and an OFF signal occurs for 50% of a predetermined cycle.

The controller 150 determines whether status data satisfy a passing acceleration release condition (S235). That is, when a power switch of the air conditioner 120 is turned off, when a vehicle speed is less than 20 kph, or when an accelerator pedal location value is less than a location reference value for release, as shown in FIG. 4, the controller 150 determines that a passing acceleration release condition is satisfied.

When a passing acceleration release condition is satisfied, the controller 150 controls the compressor 123 through an existing method (S240). That is, the controller 150 may control the compressor 123 through a temperature within the vehicle and an air temperature. For example, the controller 150 may control the compressor 123 through a Full Automatic Temperature Control (FATC).

When passing acceleration entrance in which an accelerator pedal location value is 90% or more is maintained for a predetermined time or more, the controller 150 may control the compressor 123 through the FATC at a time point at which a predetermined time is taken. In the instant case, a predetermined time is a time that is set to return to the FATC and may be, for example 15 seconds.

When a vehicle speed exists in a predetermined range, the controller 150 determines whether an engine speed and an accelerator pedal location value satisfy an oscillation acceleration entering condition (S245).

Figure 7:
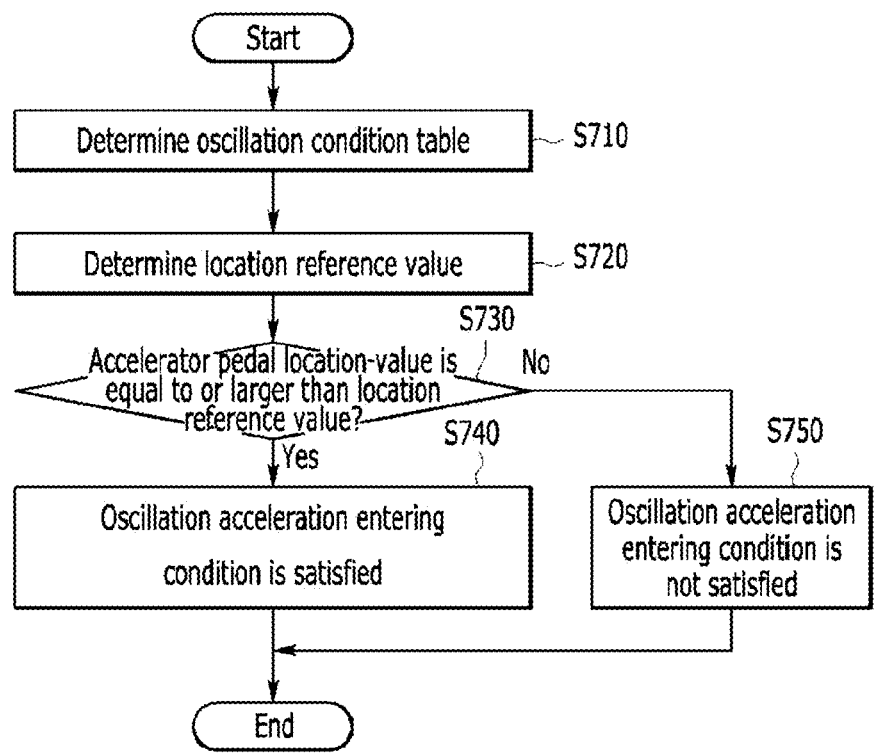
FIG. 7 is a flowchart illustrating a method of determining whether an oscillation acceleration entering condition is satisfied in a method of controlling a compressor according to an exemplary embodiment of the present invention.

Specifically, as shown in FIG. 7, when the vehicle speed exists in a predetermined range, the controller 150 determines an oscillation condition table (S710). For example, when a vehicle speed is in a range from 0 kph to less than 20 kph, the controller 150 may determine the oscillation condition table.

In the instant case, the oscillation condition table may include a location reference value for entering an oscillation acceleration control according to each of a plurality of engine speeds and may include a location reference value for releasing an oscillation acceleration control according to each of a plurality of engine speeds. The oscillation condition table is previously set.

For example, the oscillation condition table may be represented with a reference numeral 800 of FIG. 8. The oscillation condition table 800 of FIG. 8 is an illustration for describing an exemplary embodiment of the present invention, but is not limited thereto.

The controller 150 determines a location reference value according to an engine speed that is determined at step S210 through the oscillation condition table (S720). For example, as shown in FIG. 8, when the engine speed is 1500 rpm, the controller 150 may extract and determine 45% of a location reference value in which the engine speed is matched to 1500 rpm through the oscillation condition table 800.

The controller 150 determines whether an accelerator pedal location value is equal to or larger than a location reference value (S730).

When an accelerator pedal location value is equal to or larger than a location reference value, the controller 150 determines that an oscillation acceleration entering condition is satisfied (S740). For example, as shown in FIG. 8, when the accelerator pedal location value is 45%, the accelerator pedal location value is equal to or larger than a location reference value and thus the controller 150 may determine that an oscillation acceleration entering condition is satisfied. Thereafter, the process continues at step S250 and the controller 150 may determine a basic operation rate.

When the accelerator pedal location value is less than a location reference value, the controller 150 determines that an oscillation acceleration entering condition is not satisfied (S750). For example, as shown in FIG. 8, when the accelerator pedal location value is 40%, the accelerator pedal location value is less than a location reference value and thus the controller 150 may determine that an oscillation acceleration entering condition is not satisfied. Thereafter, the process returns to step S210 and the controller 150 may monitor status data.

When the engine speed and the accelerator pedal location value satisfy an oscillation acceleration entering condition, the controller 150 sets a basic operation rate of the compressor 123 according to the engine speed and the accelerator pedal location value (S250).

Specifically, the controller 150 extracts an operation rate that is matched to the engine speed and the accelerator pedal location value through the oscillation operation table and sets the operation rate to a basic operation rate.

In the instant case, the oscillation operation table includes an operation rate that is matched to the engine speed and the accelerator pedal location value and is previously set. For example, the oscillation operation table may be represented with a reference numeral 900 of FIG. 9. The oscillation operation table 900 of FIG. 9 is an illustration for describing an exemplary embodiment of the present invention, but is not limited thereto.

For example, as shown in FIG. 9, when the engine speed is 1500 rpm and when the accelerator pedal location value is 45%, the controller 150 may extract an operation rate of 50 that is matched to the engine speed and the accelerator pedal location value through the oscillation operation table and may set the operation rate to a basic operation rate.

The controller 150 determines whether a slope way measurement value is input from the data detector 130 (S255). That is, the controller 150 determines whether a slope way measurement value is input from the acceleration sensor 147 of the data detector 130.

When a slope way measurement value is input from the acceleration sensor 147, the controller 150 determines a slope way constant according to the slope way measurement value (S260). In other words, the controller 150 determines a slope way measurement value that is received from the acceleration sensor 147. In the instant case, the controller 150 may filter a slope way measurement value using the slope way measurement value and the filter constant. Here, the filter constant is a value that is set to filter the slope way measurement value and may be a predetermined value. The reason of filtering a slope way measurement value in this way is not to recognize as a hill climbing condition when having high acceleration in a flatland condition.

The controller 150 determines whether a slope way measurement value is equal to or larger than a slope way reference value. That is, to determine whether the vehicle is located at a hill, the controller 150 determines whether a slope way measurement value is equal to or larger than a slope way reference value. Here, the slope way reference value becomes a reference to determine whether the vehicle is located at a hill and may be a predetermined value. For example, the slope way reference value may be 1.8.

When a slope way measurement value is equal to or larger than a slope way reference value, the controller 150 determines first to third slope way constants through the first compensation table.

Here, the first compensation table includes first to third slope way compensation that is matched to the slope way measurement value and may be previously set. For example, the first correction table may be represented with a reference numeral 1000 of FIG. 10. The first correction table 1000 of FIG. 10 is an illustration for describing an exemplary embodiment of the present invention, but is not limited thereto.

The first to third slope way constants may be differently used according to an engine speed and an accelerator pedal location value. That is, the first slope way constant may be used when an accelerator pedal location value corresponds to a first range, the second slope way constant may be used when an accelerator pedal location value corresponds to a second range, and the third slope way constant may be used when an accelerator pedal location value corresponds to a third range or when an accelerator pedal location value corresponds to a fourth range and when an engine speed corresponds to a fifth range.

For example, the controller 150 may select a slope way constant according to an engine speed and an accelerator pedal location value among first to third slope way constants based on the oscillation operation table 900 of FIG. 9. First to fourth ranges may be a range that becomes a reference to set a slope way constant. For example, as shown in FIG. 9, a first range indicates when an accelerator pedal location value is 35%, a second range indicates when an accelerator pedal location value is from 45% to 65%, a third range indicates when an accelerator pedal location value is from 75% to 85%, a fourth range indicates when an accelerator pedal location value is 86% or more, and a fifth range indicates when an engine speed is from 3000 rpm to 6000 rpm.

When a slope way measurement value is less than a slope way reference value, the controller 150 determines first to third slope way constants through the first correction table 1000 of FIG. 10. For example, when a slope way measurement value is less than a slope way reference value, the controller 150 may determine the land to a flatland and may thus set first to third slope way constants to 1, as shown in FIG. 10.

When a slope way measurement value is not input from the acceleration sensor 147, the controller 150 determines a slope way constant according to an air temperature (S265).

Specifically, as communication with the acceleration sensor 147 is unavailable or as a failure occurs in the acceleration sensor 147, when a slope way measurement value is not input from the acceleration sensor 147, the controller 150 determines an air temperature that is received from the air temperature sensor 149.

The controller 150 determines first to third slope way constants according to an air temperature through a second correction table. In the instant case, the second correction table includes first to third slope way constants that are matched to the air temperature and may be a predetermined table. For example, the second correction table may be represented with a reference numeral 1110 of FIG. 11. The second correction table 1110 of FIG. 11 is an illustration for describing an exemplary embodiment of the present invention, but is not limited thereto.

For example, as shown in FIG. 11, when an air temperature is 35°, the controller 150 may determine that a first slope way compensation is 1 and that a second slope way compensation is 1 and that a third slope way compensation is 0 through the second correction table 1110.

The controller 150 determines an air temperature compensation constant according to an air temperature (S270). That is, the controller 150 may determine an air temperature compensation constant according to an air temperature through the compensation table of FIG. 6. For example, as shown in FIG. 6, when the air temperature is 35°, the controller 150 may extract a compensation constant 1.0 in which an air temperature is matched to 35 through the compensation table 600 and determine an air temperature compensation constant.

The controller 150 generates a final operation rate of the compressor 123 using a basic operation rate, a slope way constant, and an air temperature compensation constant (S275). In other words, the controller 150 generates a final operation rate using a basic operation rate that is set at step S250, a slope way constant that is determined at step S260 or S265, and an air temperature compensation constant that is determined at step S270. In the instant case, by performing multiplication determination of a basic operation rate, a slope way constant, and an air temperature compensation constant, the controller 150 may generate a final operation rate.

For example, when an engine speed is 1500 rpm, when an accelerator pedal location value is 45%, when a slope way measurement value is 2.0, and when an air temperature is 35, the controller 150 may determine that a basic operation rate is 50 and that a second slope way constant is 0.5 and that an air temperature compensation constant is 1.0 and may generate a final operation rate to 25% by performing multiplication determination of the basic operation rate, the second slope way constant, the air temperature compensation constant.

The controller 150 controls operation of the compressor 123 based on the final operation rate (S280).

The controller 150 determines whether status data satisfy an oscillation acceleration release condition (S285). That is, when a power switch of the air conditioner 120 is turned off, when a vehicle speed exceeds 20 kph, or when an accelerator pedal location value is less than a location reference value for release as shown in FIG. 8, the controller 150 determines that an oscillation acceleration release condition is satisfied.

When an oscillation acceleration release condition is satisfied, the controller 150 controls the compressor 123 through an existing method including a FATC (S290).

Accordingly, when a vehicle is located at a hill, the compressor control apparatus 100 according to an exemplary embodiment of the present invention reduces an operation rate of the compressor 123 through a slope way constant instead of turning off the compressor 123, securing a power performance while providing a comfortable environment to a driver.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A compressor control apparatus, comprising:
   a data detector that detects status data comprising at least one of a vehicle speed, an engine speed, an accelerator pedal location value, and a slope way measurement value; and
   a controller that determines whether an engine speed and an accelerator pedal location value of the status data satisfy an oscillation acceleration entering condition, when the vehicle speed exists in a predetermined range and that sets a predetermined operation rate of a compressor according to the engine speed and the accelerator pedal location value, when the engine speed and the accelerator pedal location value of the status data satisfy the oscillation acceleration entering condition and that generates a final operation rate of the compressor using the predetermined operation rate, a slope way constant according to the slope way measurement value, and an air temperature compensation constant according to an air temperature and that controls operation of the compressor based on the final operation rate.

2. The compressor control apparatus of claim 1, wherein the controller determines first to third slope way constants through a predetermined correction table, when the slope way measurement value is equal to or larger than a reference value, selects a slope way constant according to at least one of the engine speed and the accelerator pedal location value among the first to third slope way constants, and generates the final operation rate of the compressor using a predetermined operation rate of the compressor, a selected slope way constant, and the air temperature compensation constant.

3. The compressor control apparatus of claim 2, wherein the controller selects a first slope way constant, when the accelerator pedal location value corresponds to a first range among the first to third slope way constants, selects a second slope way constant, when the accelerator pedal location value corresponds to a second range, and selects a third slope way constant, when the accelerator pedal location value corresponds to a third range or when the accelerator pedal location value corresponds to a fourth range and when an engine speed corresponds to a fifth range.

4. The compressor control apparatus of claim 1, wherein the controller sets the predetermined operation rate of the engine speed and the accelerator pedal location value through a predetermined oscillation operation table.

5. The compressor control apparatus of claim 1, wherein the controller filters a slope way measurement value based on the slope way measurement value and a predetermined filter constant and determines a slope way constant using the filtered slope way measurement value.

6. The compressor control apparatus of claim 1, wherein the controller determines first to third slope way constants using an air temperature, when the slope way measurement value is not input from the data detector.

7. The compressor control apparatus of claim 1, wherein the controller determines whether a passing acceleration entering condition is satisfied based on the engine speed and the accelerator pedal location value, when the vehicle speed does not exist within a predetermined range, and sets a final operation rate using the predetermined operation rate of the compressor according to the accelerator pedal location value, when a passing acceleration entering condition is satisfied.

8. The compressor control apparatus of claim 7, wherein the controller sets the predetermined operation rate of the compressor according to the accelerator pedal location value through a predetermined passing operation table, when the passing acceleration entering condition is satisfied and sets the final operation rate of the compressor using the predetermined operation rate of the compressor and a compensation constant according to the air temperature.

9. A method of controlling a compressor, the method comprising:
 determining whether a vehicle speed exists in a predetermined range;
 determining, when the vehicle speed exists in the predetermined range, whether an oscillation acceleration entering condition is satisfied based on a measured engine speed and accelerator pedal location value;
 setting, when the engine speed and the accelerator pedal location value satisfy the oscillation acceleration entering condition, a predetermined operation rate of the compressor according to the engine speed and the accelerator pedal location value;
 generating a plurality of slope way constants using a slope way measurement value;
 selecting a slope way constant according to the engine speed and the accelerator pedal location value among the plurality of slope way constants;
 generating a final operation rate of the compressor using at least one of the predetermined operation rate of the compressor, a selected slope way constant, and an air temperature compensation constant according to an air temperature; and
 controlling operation of the compressor based on the final operation rate.

10. The method of claim 9, wherein the determining of whether the oscillation acceleration entering condition is satisfied comprises:
 determining an oscillation condition table comprising an enterable location reference value according to a predetermined engine speed;
 determining a location reference value according to the engine speed that is measured through the oscillation condition table; and
 determining whether the oscillation acceleration entering condition is satisfied by determining whether the accelerator pedal location value is equal to or larger than a location reference value.

11. The method of claim 9, wherein the setting of the predetermined operation rate of the compressor comprises:
 determining an oscillation operation table comprising an operation rate according to a predetermined engine speed and accelerator pedal location value; and
 extracting an operation rate that is matched to the engine speed and the accelerator pedal location value that are measured through the oscillation operation table and setting the operation rate to the predetermined operation rate.

12. The method of claim 9, wherein the plurality of slope way constants comprise first to third slope way constants, and
 wherein the selecting of the slope way constant according to the engine speed and the accelerator pedal location value among the plurality of slope way constants comprises: one of
 selecting, when the accelerator pedal location value corresponds to a first range, a first slope way constant;
 selecting, when the accelerator pedal location value corresponds to a second range, a second slope way constant; and
 selecting, when the accelerator pedal location value corresponds to a third range or when the accelerator pedal location value corresponds to a fourth range and when the engine speed corresponds to a fifth range, a third slope way constant.

13. The method of claim 9, further comprising:
 generating a plurality of slope way constants using the slope way measurement value;
 determining whether the slope way measurement value is equal to or larger than a slope way reference value; and
 generating, when the slope way measurement value is equal to or larger than the slope way reference value, a plurality of slope way constants through a correction table.

14. The method of claim 9, further comprising:
 determining a plurality of slope way constants using the slope way measurement value;
 determining whether the slope way measurement value is input from an acceleration sensor;
 determining the air temperature, when the slope way measurement value is not input from the acceleration sensor; and
 determining a plurality of slope way constants using the air temperature.

15. The method of claim 9, wherein the determining of the plurality of slope way constants using the slope way measurement value comprises:
 filtering the slope way measurement value; and
 determining the plurality of slope way constants using the filtered slope way measurement value.

16. The method of claim 9, wherein the generating of the final operation rate of the compressor comprises generating the final operation rate of the compressor by performing multiplication determination of the predetermined operation rate of the compressor, a slope way constant, and the air temperature compensation constant.

17. The method of claim 9, further comprising: after determining whether the vehicle speed exists in the predetermined range,
  determining, when the vehicle speed does not exist within the predetermined range, whether the measured engine speed and accelerator pedal location value satisfy the passing acceleration entering condition;
  generating, when the engine speed and the accelerator pedal location value satisfy a passing acceleration entering condition, the final operation rate using the predetermined operation rate of the compressor according to the accelerator pedal location value; and
  controlling operation of the compressor based on the final operation rate.

18. The method of claim 17, wherein the generating of the final operation rate using the predetermined operation rate of the compressor according to the accelerator pedal location value comprises:
  determining a passing operation table comprising an operation rate according to a predetermined accelerator pedal location value;
  extracting an operation rate that is matched to the accelerator pedal location value that is measured through the passing operation table and setting the operation rate to the predetermined operation rate of the compressor; and
  generating the final operation rate using the predetermined operation rate of the compressor and the air temperature compensation constant according to the air temperature.

19. The method of claim 17, further comprising:
  determining whether the passing acceleration entering condition is satisfied;
  determining a passing condition table comprising an enterable location reference value according to a predetermined engine speed;
  determining a location reference value according to a measured engine speed through the passing condition table; and
  determining whether a passing acceleration entering condition is satisfied by determining whether the accelerator pedal location value is equal to or larger than a location reference value.

* * * * *